United States Patent
Scott et al.

(10) Patent No.: US 10,240,532 B2
(45) Date of Patent: Mar. 26, 2019

(54) FRAME JUNCTION COOLING HOLES

(71) Applicant: United Technologies Corporation, Hartford, CT (US)

(72) Inventors: Jonathan Ariel Scott, Southington, CT (US); William Yeager, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 680 days.

(21) Appl. No.: 14/655,656

(22) PCT Filed: Dec. 20, 2013

(86) PCT No.: PCT/US2013/077137
§ 371 (c)(1),
(2) Date: Jun. 25, 2015

(87) PCT Pub. No.: WO2014/143329
PCT Pub. Date: Sep. 18, 2014

(65) Prior Publication Data
US 2015/0345400 A1    Dec. 3, 2015

Related U.S. Application Data

(60) Provisional application No. 61/747,275, filed on Dec. 29, 2012.

(51) Int. Cl.
*F02C 7/20*   (2006.01)
*F02C 7/12*   (2006.01)
(Continued)

(52) U.S. Cl.
CPC ............. *F02C 7/20* (2013.01); *F01D 9/065* (2013.01); *F01D 25/162* (2013.01); *F02C 7/12* (2013.01);
(Continued)

(58) Field of Classification Search
CPC ...... F02C 7/20; F02C 7/12; F01D 9/06; F01D 9/065; F01D 25/16; F01D 25/162; F05D 2220/36; F05D 2250/38
(Continued)

(56) References Cited

U.S. PATENT DOCUMENTS 2,214,108 A    7/1938   Grece
3,576,328 A    4/1971   Vase
(Continued)

FOREIGN PATENT DOCUMENTS

WO    WO 03/020469 A1    3/2003
WO    WO 2006/007686 A1    1/2006
(Continued)

OTHER PUBLICATIONS

International Search Report dated Oct. 22, 2014 for corresponding PCT Application No. PCT/US2013/077137.

*Primary Examiner* — Phutthiwat Wongwian
*Assistant Examiner* — Loren Edwards
(74) *Attorney, Agent, or Firm* — Kinney & Lange, P.A.

(57) ABSTRACT

A module for a gas turbine engine comprises a frame and a frame cooling system. The frame includes a circumferentially distributed plurality of radially extending struts. Each strut is joined to an outer frame section at an outer frame junction, and joined to an inner frame section at an inner frame junction. The frame cooling system comprises an inlet, a plurality of cooling air passages extending from the inlet radially through each of the plurality of frame struts; and an outlet. The outlet is in fluid communication with at least one of the cooling air passages and includes a film cooling hole formed through the frame proximate the outer frame junction.

24 Claims, 9 Drawing Sheets

(51) Int. Cl.
  *F01D 9/06* (2006.01)
  *F01D 25/16* (2006.01)
(52) U.S. Cl.
  CPC ...... *F05D 2220/36* (2013.01); *F05D 2250/38* (2013.01)
(58) Field of Classification Search
  USPC .................. 60/796, 797, 806, 266, 39.83
  See application file for complete search history.

(56) References Cited

U.S. PATENT DOCUMENTS

| | | | |
|---|---|---|---|
| 3,802,046 A | 4/1974 | Wachtell et al. | |
| 3,970,319 A | 7/1976 | Carroll et al. | |
| 4,009,569 A | 3/1977 | Kozlin | |
| 4,044,555 A | 4/1977 | McLoughlin et al. | |
| 4,088,422 A | 5/1978 | Martin | |
| 4,114,248 A | 9/1978 | Smith et al. | |
| 4,305,697 A | 12/1981 | Cohen et al. | |
| 4,321,007 A | 3/1982 | Dennison et al. | |
| 4,369,016 A | 1/1983 | Dennison | |
| 4,478,551 A | 10/1984 | Honeycutt, Jr. et al. | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,793,770 A | 12/1988 | Schonewald et al. | |
| 4,920,742 A | 5/1990 | Nash et al. | |
| 4,987,736 A | 1/1991 | Ciokajlo et al. | |
| 4,989,406 A | 2/1991 | Vdoviak et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,076,049 A | 12/1991 | VonBenken et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,236,302 A | 8/1993 | Weisgerber et al. | |
| 5,246,295 A | 9/1993 | Ide | |
| 5,265,807 A | 11/1993 | Steckbeck et al. | |
| 5,269,057 A | 12/1993 | Mendham | |
| 5,272,869 A | 12/1993 | Dawson et al. | |
| 5,273,397 A | 12/1993 | Czachor et al. | |
| 5,292,227 A | 3/1994 | Czachor et al. | |
| 5,312,227 A | 5/1994 | Grateau et al. | |
| 5,338,154 A | 8/1994 | Meade et al. | |
| 5,357,744 A | 10/1994 | Czachor et al. | |
| 5,370,402 A | 12/1994 | Gardner et al. | |
| 5,385,409 A | 1/1995 | Ide | |
| 5,401,036 A | 3/1995 | Basu | |
| 5,438,756 A | 8/1995 | Halchak et al. | |
| 5,474,305 A | 12/1995 | Flower | |
| 5,483,792 A | 1/1996 | Czachor et al. | |
| 5,558,341 A | 9/1996 | McNickle et al. | |
| 5,597,286 A | 1/1997 | Dawson et al. | |
| 5,605,438 A | 2/1997 | Burdgick et al. | |
| 5,609,467 A | 3/1997 | Lenhart et al. | |
| 5,632,493 A | 5/1997 | Gardner | |
| 5,634,767 A | 6/1997 | Dawson | |
| 5,691,279 A | 11/1997 | Tauber et al. | |
| 5,755,445 A | 5/1998 | Arora | |
| 5,851,105 A | 12/1998 | Fric et al. | |
| 5,911,400 A | 6/1999 | Niethammer et al. | |
| 6,163,959 A | 12/2000 | Arraitz et al. | |
| 6,196,550 B1 | 3/2001 | Arora et al. | |
| 6,227,800 B1 | 5/2001 | Spring et al. | |
| 6,337,751 B1 | 1/2002 | Kimizuka | |
| 6,343,912 B1 | 2/2002 | Mangeiga et al. | |
| 6,358,001 B1 | 3/2002 | Bosel et al. | |
| 6,364,316 B1 | 4/2002 | Arora | |
| 6,439,841 B1 | 8/2002 | Bosel | |
| 6,511,284 B2 | 1/2003 | Darnell et al. | |
| 6,578,363 B2 | 6/2003 | Hashimoto et al. | |
| 6,601,853 B2 | 8/2003 | Inoue | |
| 6,612,807 B2 | 9/2003 | Czachor | |
| 6,619,030 B1 | 9/2003 | Seda et al. | |
| 6,638,013 B2 | 10/2003 | Nguyen et al. | |
| 6,652,229 B2 | 11/2003 | Lu | |
| 6,672,833 B2 | 1/2004 | MacLean et al. | |
| 6,719,524 B2 | 4/2004 | Nguyen et al. | |
| 6,736,401 B2 | 5/2004 | Chung et al. | |
| 6,792,758 B2 | 9/2004 | Dowman | |
| 6,796,765 B2 | 9/2004 | Kosel et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,969,826 B2 | 11/2005 | Trewiler et al. | |
| 6,983,608 B2 | 1/2006 | Allen, Jr. et al. | |
| 7,055,305 B2 | 6/2006 | Baxter et al. | |
| 7,094,026 B2 | 8/2006 | Coign et al. | |
| 7,100,358 B2 | 9/2006 | Gekht et al. | |
| 7,200,933 B2 | 4/2007 | Lundgren et al. | |
| 7,229,249 B2 | 6/2007 | Durocher et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,389,583 B2 | 6/2008 | Lundgren | |
| 7,614,150 B2 | 11/2009 | Lundgren | |
| 7,631,879 B2 | 12/2009 | Diantonio | |
| 7,673,461 B2 | 3/2010 | Cameriano et al. | |
| 7,677,047 B2 | 3/2010 | Somanath et al. | |
| 7,735,833 B2 | 6/2010 | Braun et al. | |
| 7,798,768 B2 | 9/2010 | Strain et al. | |
| 7,815,417 B2 | 10/2010 | Somanath et al. | |
| 7,824,152 B2 | 11/2010 | Morrison | |
| 7,891,165 B2 | 2/2011 | Bader et al. | |
| 7,909,573 B2 | 3/2011 | Cameriano et al. | |
| 7,955,446 B2 | 6/2011 | Dierberger | |
| 7,959,409 B2 | 6/2011 | Guo et al. | |
| 7,988,799 B2 | 8/2011 | Dierberger | |
| 8,069,648 B2 | 12/2011 | Snyder et al. | |
| 8,083,465 B2 | 12/2011 | Herbst et al. | |
| 8,091,371 B2 | 1/2012 | Durocher et al. | |
| 8,092,161 B2 | 1/2012 | Cai et al. | |
| 8,152,451 B2 | 4/2012 | Manteiga et al. | |
| 8,162,593 B2 | 4/2012 | Guimbard et al. | |
| 8,172,526 B2 | 5/2012 | Lescure et al. | |
| 8,177,488 B2 | 5/2012 | Manteiga et al. | |
| 8,221,071 B2 | 7/2012 | Wojno et al. | |
| 8,245,399 B2 | 8/2012 | Anantharaman et al. | |
| 8,245,518 B2 | 8/2012 | Durocher et al. | |
| 8,282,342 B2 | 10/2012 | Tonks et al. | |
| 8,371,127 B2 | 2/2013 | Durocher et al. | |
| 8,371,812 B2 | 2/2013 | Manteiga et al. | |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2006/0010852 A1 | 1/2006 | Gekht et al. | |
| 2006/0042223 A1 | 3/2006 | Walker et al. | |
| 2006/0123796 A1 | 6/2006 | Aycock et al. | |
| 2008/0216300 A1 | 9/2008 | Anderson et al. | |
| 2010/0061846 A1 | 3/2010 | Herbst et al. | |
| 2010/0132371 A1 | 6/2010 | Durocher et al. | |
| 2010/0132374 A1 | 6/2010 | Manteiga et al. | |
| 2010/0132377 A1 | 6/2010 | Durocher et al. | |
| 2010/0135777 A1* | 6/2010 | Manteiga ................ | F01D 9/02 415/190 |
| 2010/0202872 A1 | 8/2010 | Weidmann | |
| 2010/0236244 A1 | 9/2010 | Longardner | |
| 2010/0275572 A1 | 11/2010 | Durocher et al. | |
| 2010/0275614 A1 | 11/2010 | Fontaine et al. | |
| 2010/0307165 A1 | 12/2010 | Wong et al. | |
| 2011/0000223 A1 | 1/2011 | Russberg | |
| 2011/0005234 A1 | 1/2011 | Hashimoto et al. | |
| 2011/0061767 A1 | 3/2011 | Vontell et al. | |
| 2011/0081237 A1 | 4/2011 | Durocher | |
| 2011/0081239 A1 | 4/2011 | Durocher | |
| 2011/0081240 A1 | 4/2011 | Durocher et al. | |

(56) References Cited

U.S. PATENT DOCUMENTS

| | | |
|---|---|---|
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| WO | WO 2009/157817 A1 | 12/2009 |
| WO | WO 2010/002295 A1 | 1/2010 |
| WO | WO 2012/158070 A1 | 11/2012 |

\* cited by examiner

FRAME JUNCTION COOLING HOLES

BACKGROUND

The described subject matter relates generally to gas turbine engines, and more specifically to cases and frames for gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Gas turbine engines are supported by frames which typically include one or more struts. The struts connect outer and inner cases and cross a flow passage carrying working gases such as combustion products. Due to the need for the struts to retain their strength at high temperatures, frames used on the turbine side of the engine have been produced using investment cast superalloys. However, casting of superalloys becomes more difficult and expensive as the radial dimension of the frame increases. As such, a need has been recognized for reducing the temperature of the frame without sacrificing the efficiency gains seen with higher combustion temperatures.

SUMMARY

A module for a gas turbine engine comprises a frame and a frame cooling system. The frame includes a circumferentially distributed plurality of radially extending struts. Each strut is joined to an outer frame section at an outer frame junction, and joined to an inner frame section at an inner frame junction. The frame cooling system comprises an inlet, a plurality of cooling air passages extending from the inlet radially through each of the plurality of frame struts, and an outlet. The outlet is in fluid communication with at least one of the cooling air passages and includes a film cooling hole formed through the frame proximate the outer frame junction.

A gas turbine engine frame comprises an outer case, an inner hub, and a strut extending radially between the inner hub and the outer case. The strut is joined to the outer case at an outer frame junction, and is joined to the inner case at the inner frame junction. A frame cooling system includes an inlet, a cooling air passage extending from the inlet radially through the strut, and an outlet in fluid communication with the cooling air passage. The outlet includes at least one film cooling hole formed through at least one circumferential side of the outer frame junction.

DETAILED DESCRIPTION

A turbine exhaust case can include a frame with cooling air passages and cooling holes. Frame cooling passages that extend through the inner hub, the struts, and the outer case. At least one of these passages can be provided with cooling holes to conduct cooling air from the passage to cool annular surfaces of the frame. Cooling holes can be disposed around an outer frame junction to cool the outer frame as well as the struts. The cooling air passages as well as the count, size, direction, and angles of the junction cooling holes can be tailored to help lower frame surface temperatures, enabling the use of less costly materials that are easier to process than superalloys traditionally used in gas turbine frames.

It will be recognized that like numbers refer to similar structures throughout the figures.

Figure 1:
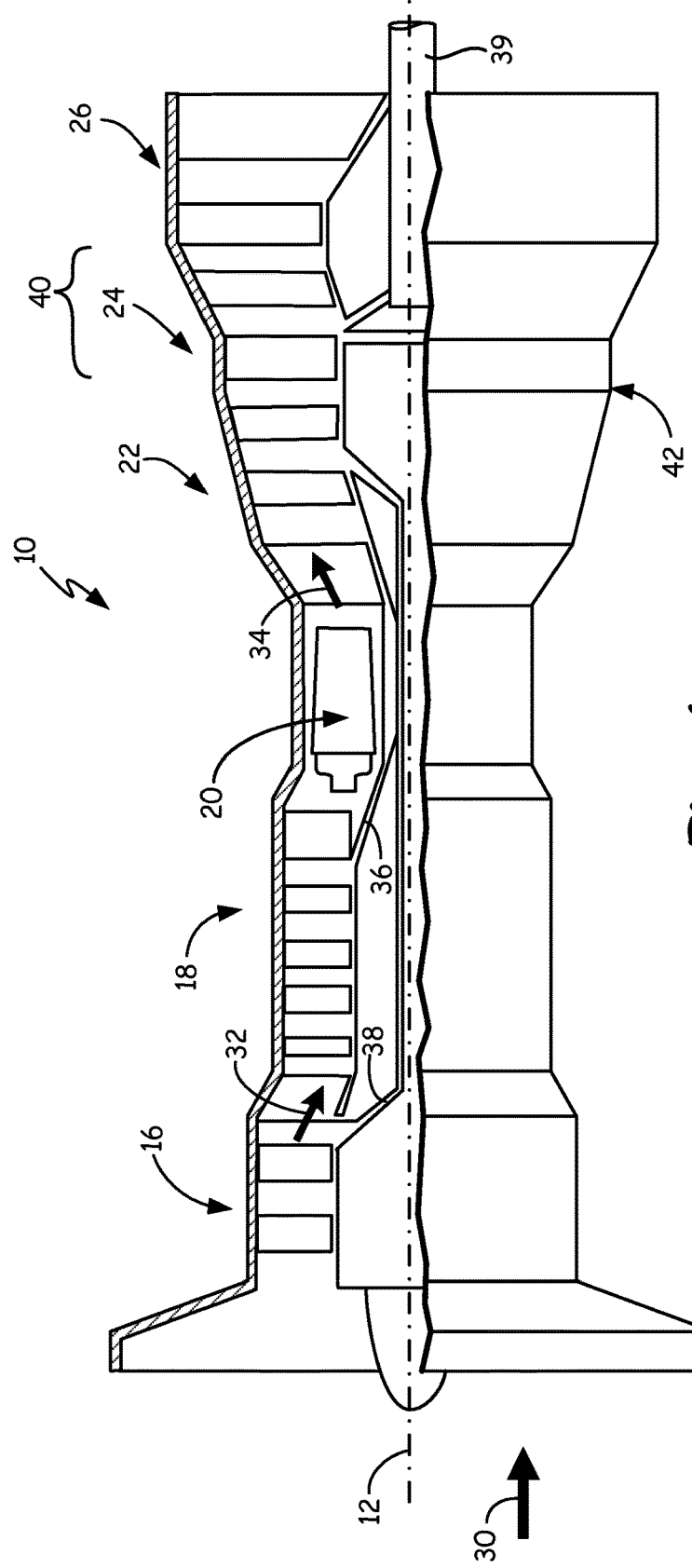
FIG. 1 schematically depicts a cross-section of a gas turbine engine.

FIG. 1 shows industrial gas turbine engine 10, one example of a gas turbine engine. Engine 10 is circumferentially disposed about a central, longitudinal axis, or engine centerline axis 12, and includes in series order, low pressure compressor section 16, high pressure compressor section 18, combustor section 20, high pressure turbine section 22, and low pressure turbine section 24. In some examples, a free turbine section 26 is disposed aft of the low pressure turbine 24. Free turbine section 26 is often described as a "power turbine" and may rotationally drive one or more generators, centrifugal pumps, or other apparatus.

As is well known in the art of gas turbines, incoming ambient air 30 becomes pressurized air 32 in compressors 16, 18. Fuel mixes with pressurized air 32 in combustor section 20, where it is burned. Once burned, combustion gases 34 expand through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown) via power turbine shaft 39.

FIG. 1 also shows turbine assembly 40, which includes two turbine modules interconnected by turbine exhaust case (TEC) assembly 42. Here, turbine assembly 40 can include turbine exhaust case TEC assembly 42 disposed axially between low pressure turbine section 24 and power turbine 26.

FIG. 1 provides a basic understanding and overview of the various sections and the basic operation of an industrial gas turbine engine. Although illustrated with reference to an industrial gas turbine engine, the described subject matter also extends to aero engines having a fan with or without a fan speed reduction gearbox, as well as those engines with more or fewer sections than illustrated. It will become apparent to those skilled in the art that the present application is applicable to all types of gas turbine engines, including those in aerospace applications. In this example, the subject matter is described with respect to TEC assembly 42 between turbine sections 24, 26 configured in a sequential flow arrangement for an industrial gas turbine engine. However, it will be appreciated that the teachings can be readily adapted to other turbine applications with fluidly coupled modules, such as but not limited to a mid-turbine frame, an interstage turbine frame, and/or a turbine exhaust case for an aircraft engine. In other alternative embodiments, TEC assembly 42 can be adapted into a case assembly or module for portions of compressor sections 16 and/or 18.

Figure 2A:
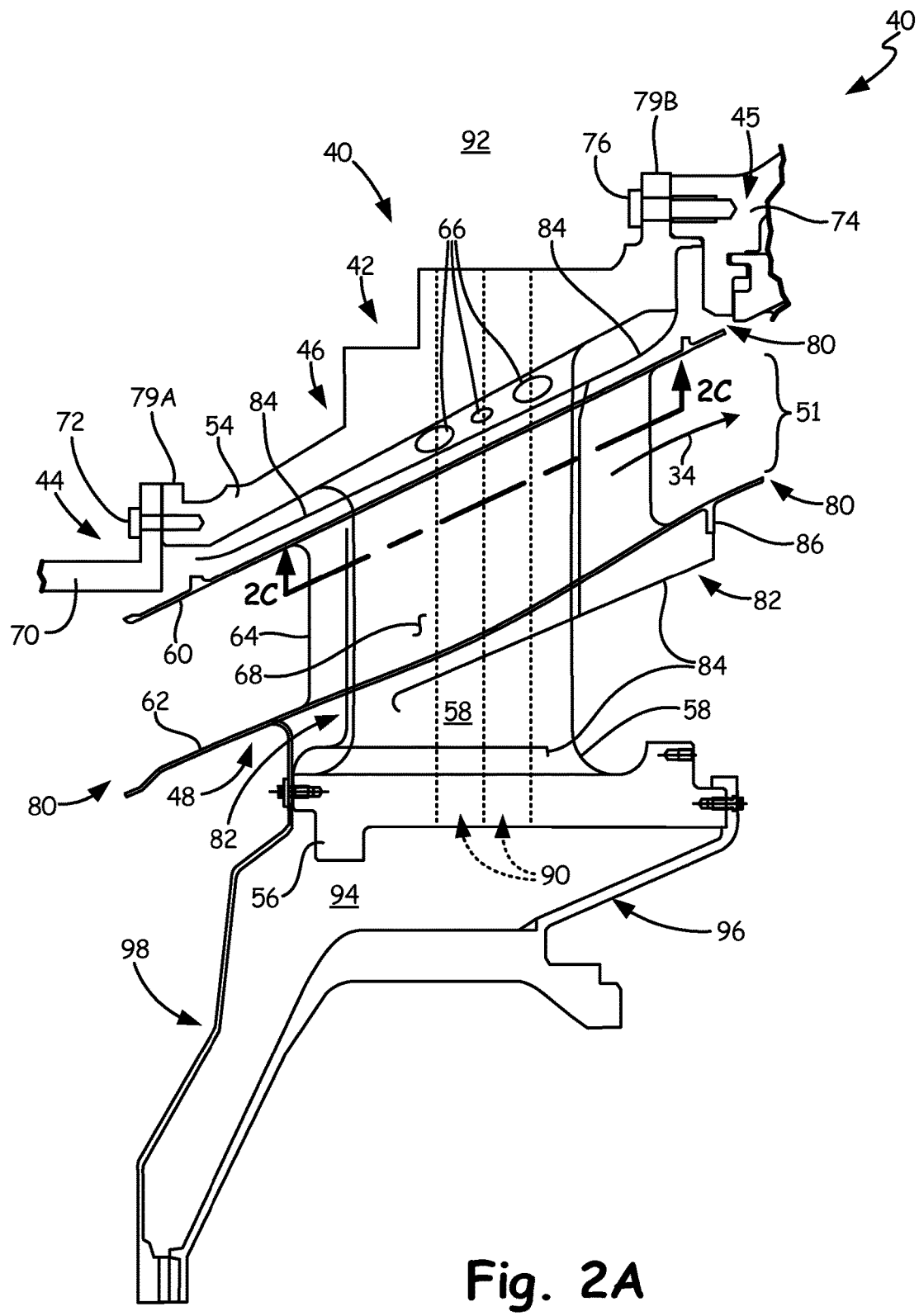
FIG. 2A shows a detailed cross-section of a turbine assembly, including a first turbine section and a second turbine section interconnected by a module with a frame cooling system.
Figure 2B:
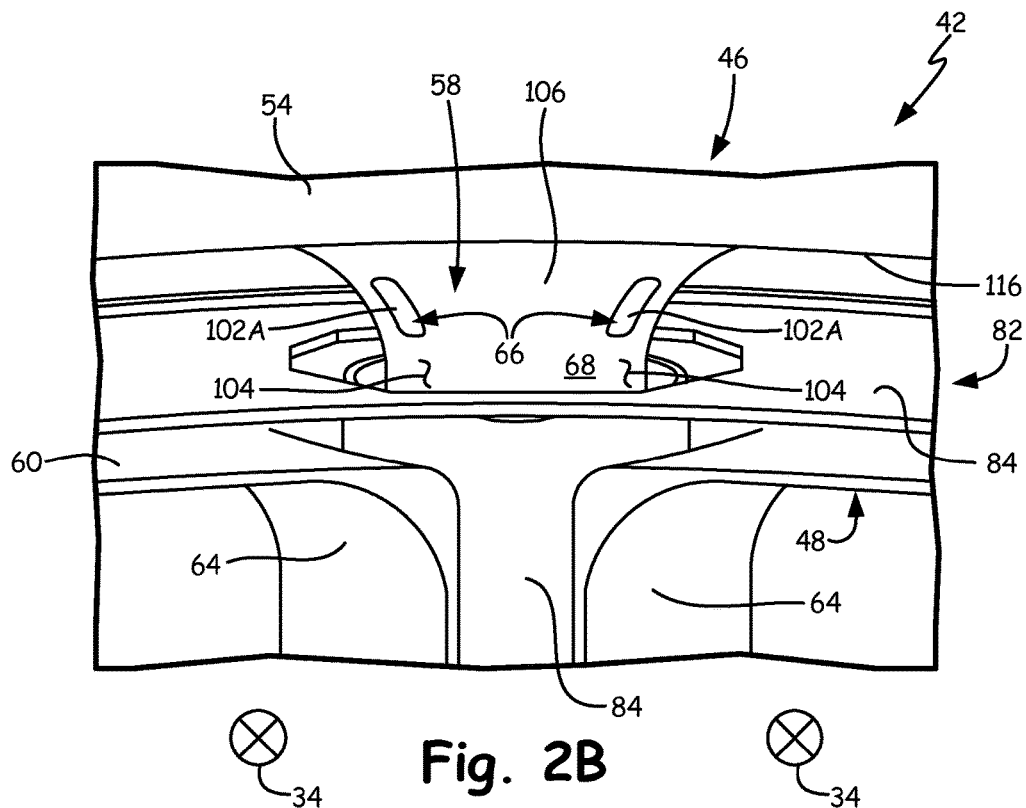
FIG. 2B is a detailed plan view of a portion of the module shown in FIG. 2A.
Figure 2C:
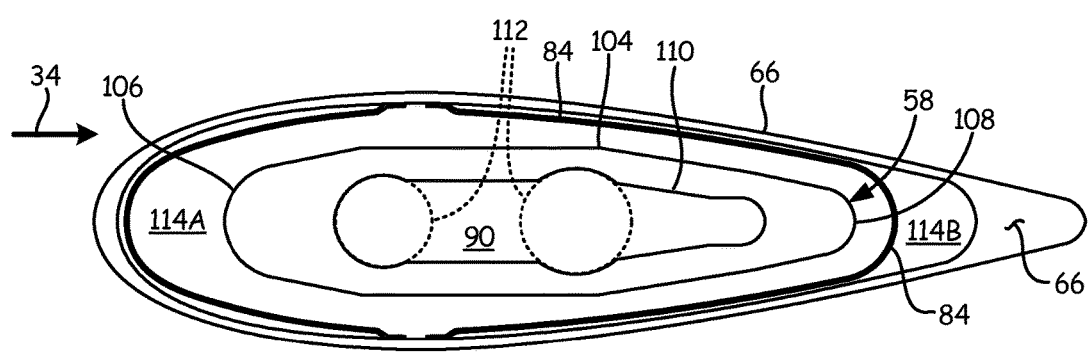
FIG. 2C shows an axial section view taken across line 2C-2C of FIG. 2A.

FIGS. 2A, 2B, and 2C show turbine assembly 40 with TEC assembly 42. TEC assembly 42 interconnects an upstream turbine module 44 (partially shown) such as a low-pres sure turbine module, with a downstream turbine module 45 (partially shown) such as a power turbine module. As was shown in FIG. 1, low-pressure turbine 24 drives a first shaft (low-pressure shaft 38), while power turbine 26 drives a second shaft (power turbine shaft 39) independently of the first shaft.

As seen in FIGS. 2A, 2B, and 2C, TEC assembly 42 includes frame 46 and fairing assembly 48. Fairing assembly 48 defines main gas flow passage 51 for working/combustion gases 34 to flow generally axially through frame 46 during engine operation. In a conventional industrial gas turbine (IGT) system, upstream module 44 (e.g., low-pressure turbine 24 shown in FIG. 1) can include other components (not shown) such as a rotor blade and/or exit guide vane. These other components are disposed upstream of frame 46 and fairing assembly 48 with respect to a conventional flow direction of working gases 34. Downstream module 45 (e.g., power turbine 26 shown in FIG. 1) can also include other components (not shown) such as an inlet guide vane and/or rotor blade. These other components are disposed downstream of TEC assembly frame 46 and fairing assembly 48 with respect to the flow direction of working gases 34.

Frame 46 includes outer case 54, inner hub 56, and a circumferentially distributed plurality of struts 58 (only one shown in FIGS. 2A, 2B, and 2C). Struts 58 extend radially between outer case 54 and inner hub 56. Struts 58 can be joined to outer case 54 and inner case 56 by casting, forging, welding, or other bonding processes. In certain embodiments, frame 46 is formed from a single casting comprising precursors to outer case 54, inner case 56, and struts 58.

In the embodiment shown, fairing assembly 48, which includes outer fairing platform 60, inner fairing platform 62, and strut liners 64, is secured over annular surfaces of frame 46. Outer fairing platform 60 and inner fairing platform 62 each have a generally conical shape. Inner fairing platform 62 is spaced from outer platform 60 by strut liners 64. In this example, outer fairing platform 60 is disposed radially inward of outer case 54, while inner fairing platform 62 may be disposed radially outward of inner frame hub 56. Strut liners 64 can also be disposed over frame struts 58. When assembled, outer fairing platform 60, inner fairing platform 62, and fairing strut liners 64 define a portion of main gas flow passage 51.

During operation, frame 46 is exposed to the heat of working gases 34 flowing through main gas flow passage 51. To control the temperature of frame 46 and enable the use of lower temperature materials, frame 46 can include a frame cooling system. The frame cooling system can comprise an inlet, an outlet, and a cooling air passage extending radially through one or more struts 58. In FIG. 2A, cooling air outlet 66 is visible on one strut circumferential wall 68. Additional details and examples of various inlets, outlets, and cooling air passages are described in more detail throughout this specification.

As noted above, TEC assembly 42 can interconnect adjacent turbine modules 44, 45 by way of frame outer case 54. Upstream (first) turbine module 44 includes outer case 70 connected to a forward side of TEC frame outer case 54 via fasteners 72, while downstream (second) turbine module 45 includes outer case 74 connected to an aft side of TEC frame outer case 54 via fasteners 76. TEC frame outer case 54 similarly includes forward flange 79A and aft flange 79B. TEC assembly 42 includes aft casing flange 79A and forward casing flange 79B for interconnecting TEC assembly 42 with other modules into engine 10 (shown in FIG. 1).

In addition, main gas flow passage 51 can be sealed around these and other interconnections to prevent leakage and unwanted heating of frame 42. In one example, seals (not shown) are located around the edges 80 of fairing assembly 48. One or more of these seals may be part of a larger seal assembly adapted to perform multiple sealing and support functions while helping to direct secondary air flow in and around frame 46.

To further prevent excess heating of frame 46, TEC assembly 42 also can include heat shield assembly 82 comprising one or more heat shield segments 84. Heat shield assembly 82 reduces radiative heating of frame 46 by reflecting thermal radiation back toward fairing assembly 48 and away from annular surfaces of frame 46. Heat shield segments 84 are arranged in lines of sight between fairing assembly 48 and frame 46, but are not secured directly to the hottest portions of fairing assembly 48 designed to be exposed to working gas flow 34. Rather, heat shield segments 84 can be secured to cooler portions of TEC assembly 42 such as frame 46 or external fairing flanges 86 as shown in FIGS. 2A, 2B, and 2C.

Frame 46 can also include one or more passages 90 (shown in phantom) formed radially through struts 58. To further reduce temperature of frame 46, at least one passage 90 can carry cooling air between outer cavity 92 and inner cavity 94. Inner cavity 94 is disposed radially inward of inner hub 56, and is defined by inner hub 56, bearing support 96, and outer flow divider wall 98. As such, passages 90 may additionally and/or alternatively carry oil or buffer air service lines (not shown in FIG. 2) which continue through both inner cavity 94 and bearing support 96 into a bearing compartment (not shown).

FIG. 2B is a detailed aft-facing view of a portion of TEC assembly 42. FIG. 2C shows a sectional view of TEC assembly 42 taken across line 2C-2C of FIG. 2A. FIGS. 2B and 2C show features of TEC assembly 42 and frame 46 which allow for substitution of lower temperature materials and manufacturing processes in place of more expensive temperature-resistant materials, such as investment cast nickel-based superalloys.

As seen in FIG. 2B, strut 58 can be provided with cooling air outlets 66 on either circumferential wall 68 to reduce surface temperatures of frame 46. In the example shown, outlet(s) 66 include one or more film cooling holes 102A, which are adapted to conduct a portion of frame cooling air from passage 90 (shown in FIG. 2C) to a periphery of strut 58. Cooling air exits cooling holes 102A and flows along or against one or more frame surfaces including circumferential strut walls 68. Circumferential strut walls 68 and other annular frame surfaces are heated due to the proximity of one or more fairings, such as outer fairing platform 60 and strut liner 64, which are exposed to working or combustion gases 34.

In FIG. 2B, film cooling holes 102A are formed through one or both circumferential strut walls 68, and have an exit portion directed toward strut forward end 106. Subsequent figures show other examples of outlets 66 with different film cooling hole configurations. For example, one or more film cooling holes can have exit portions extending normal to circumferential strut wall surface 104. Other film cooling holes can have exit portions directed toward strut aft end 108 (shown in FIG. 2C). One or more film cooling holes can also be angled radially inboard or outboard relative to engine center line 12 (shown in FIG. 1) to minimize flow separation of the exiting cooling air along strut wall surfaces 104.

FIG. 2C shows radial passages 90 which provide fluid communication between one or more inlets (shown in FIG. 3B) and outlet(s) 66. In certain embodiments, cooling air can flow radially outward through passage 90 (defined by inner passage surface 110) from inner cavity 92 toward outer cavity 94 (shown in FIG. 2A). In certain embodiments, portions of inner passage surface 110 can be shaped to accommodate one or more service lines 112 (shown in phantom) while still maintaining sufficient radial coolant flow through passages 90. Cooling air can return toward inner hub 56 through fairing cavities 114A, 114B formed on either circumferential side of heat shield elements 84.

Figure 3A:
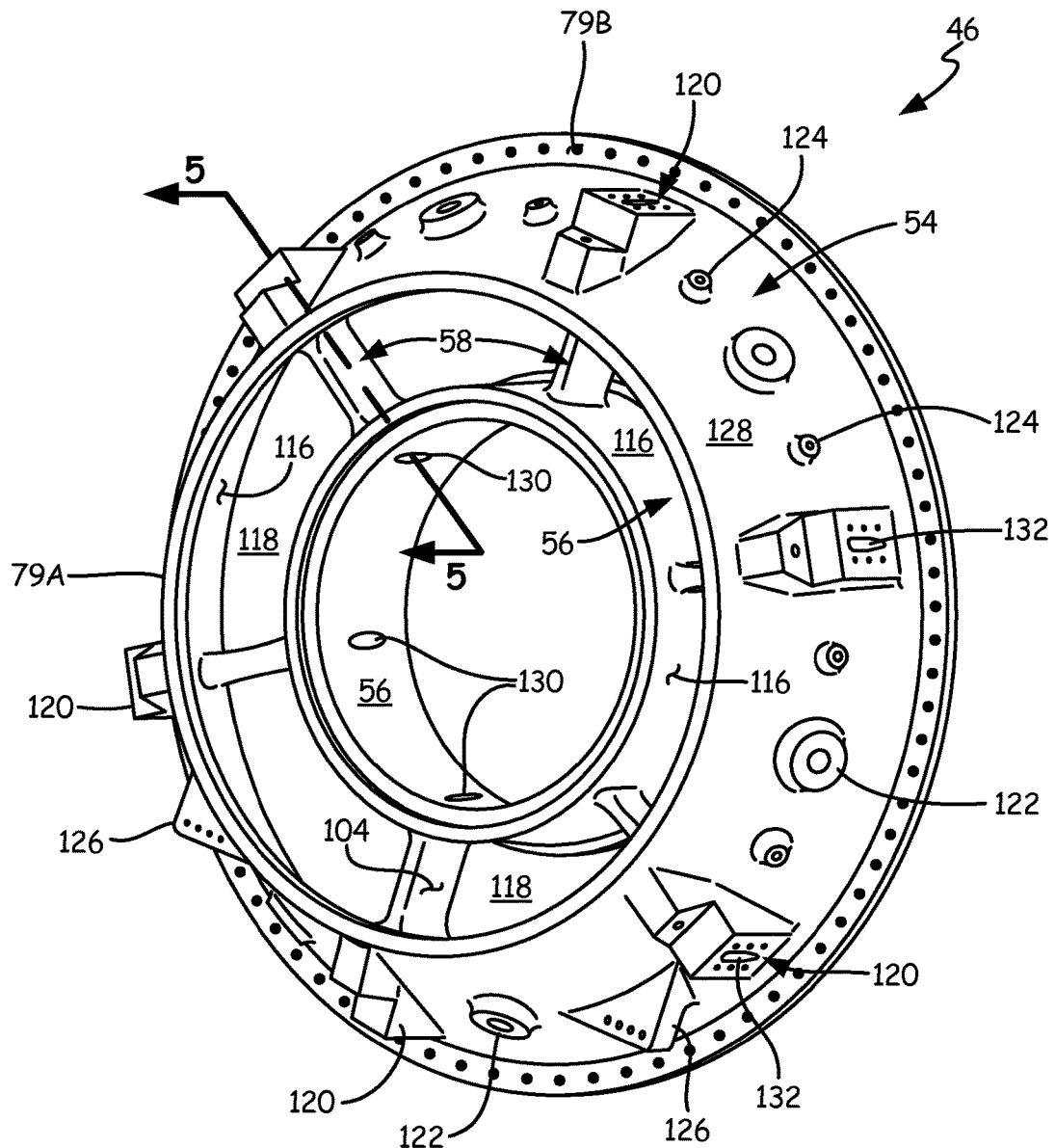
FIG. 3A isometrically depicts a forward side of an example frame incorporating a frame cooling system.
Figure 3B:
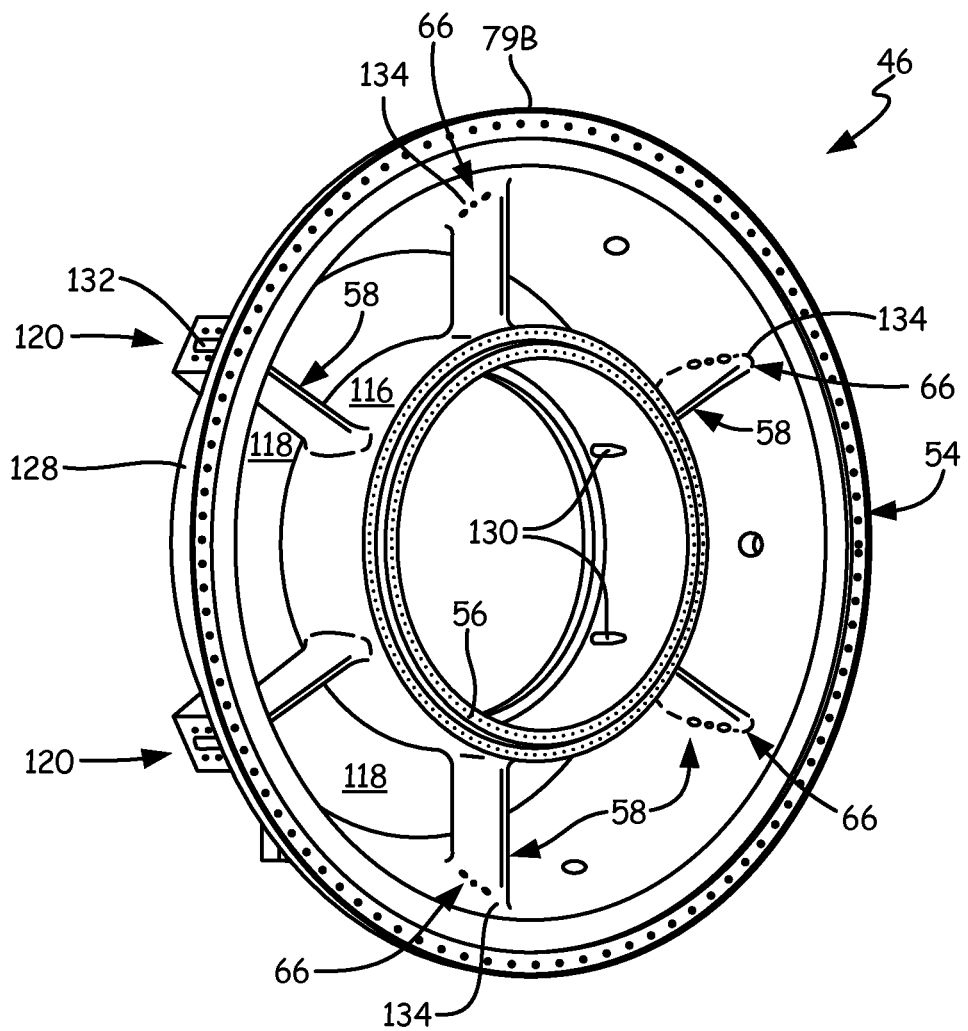
FIG. 3B isometrically depicts an aft side of the frame shown in FIG. 3A.

FIG. 3A isometrically depicts a forward side of frame 46, while FIG. 3B isometrically depicts an aft side of frame 46. Frame 46 includes a circumferentially distributed plurality of struts 58 extending radially between outer case 54 and inner hub 56. As seen in FIGS. 2A and 2B, fairing assembly 48 comprises a plurality of fairing elements disposed over and spaced apart from frame 46 to define main gas flow passage 51. FIG. 3A shows annular frame surfaces 116 over which the fairing segments may be secured. Annular surfaces 116 include the surfaces of frame 46 bounding annular frame cavity 118. These include platform surfaces of outer case 54 and inner hub 56, as well as outer surfaces of strut circumferential walls 68.

A number of mounting, operational, and inspection features such as outer case mounting flanges 79A, 79B, strut bosses 120, probe bosses 122, borescope bosses 124, and frame support stands 126, can be formed out of outer frame surface 128. These may be formed by a combination of casting, forging, and/or machining. Other features such as inner and outer strut ports 130, 132 can be machined respectively through inner hub 56 and outer case 54 to provide access to strut passages 90 (shown in FIGS. 2A and 2B). Cooling air outlets 66 are also machined through struts 58, outer frame junction 134, and/or inner frame junction 135.

In this example, passage inlets 130 are machined or otherwise formed through inner frame hub 58. Passage inlets 130 are circumferentially aligned with strut 58 and passage 90, and can include a cover plate or other device (not shown) operable to meter cooling air and/or retain any service lines (not shown) extending through passage 90. Alternatively, cooling air flow enters passage 90 from a separate inlet formed through inner hub 56 and which is circumferentially offset from passage 90. This alternative provides additional length through which the cooling air must travel, which can further reduce operating temperatures of inner hub 56.

Figure 4:
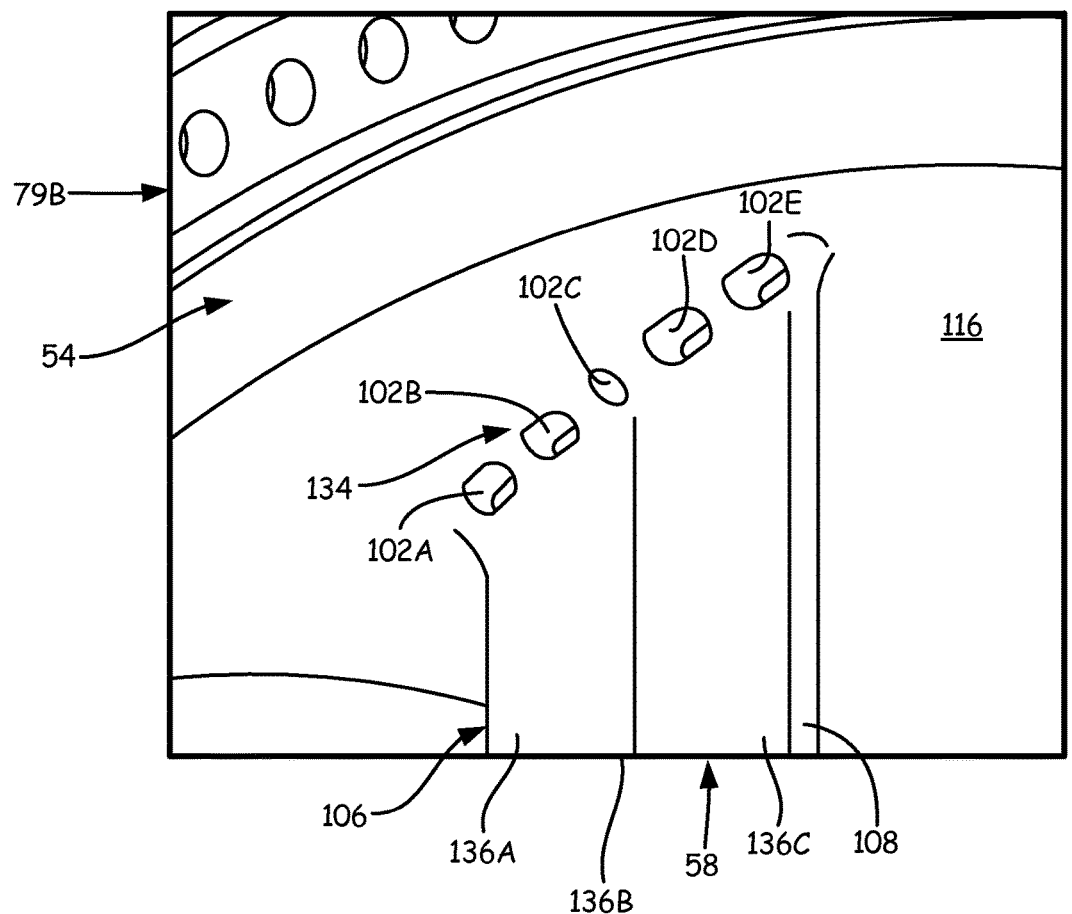
FIG. 4 is a detailed view of a portion of the frame shown in FIG. 3B.

To facilitate use of lower temperature structural materials such as certain high-strength steel alloys, frame 46 can be provided with a cooling system comprising at least one cooling air passage 90 providing fluid communication through strut 58, between cooling air inlets 130 and cooling air outlets 66. In certain embodiments, each strut 58 includes one or more radially extending passages 90. Each outlet 66 can comprise a plurality of film cooling holes as shown in FIG. 4. Here, each strut 58 includes cooling air outlet 66 through both circumferential strut walls 68. Each cooling air outlet comprises three film cooling holes aligned in a showerhead configuration along each outer frame junction 134, proximate the intersections of outer case 54 and each strut 58.

Figure 5:
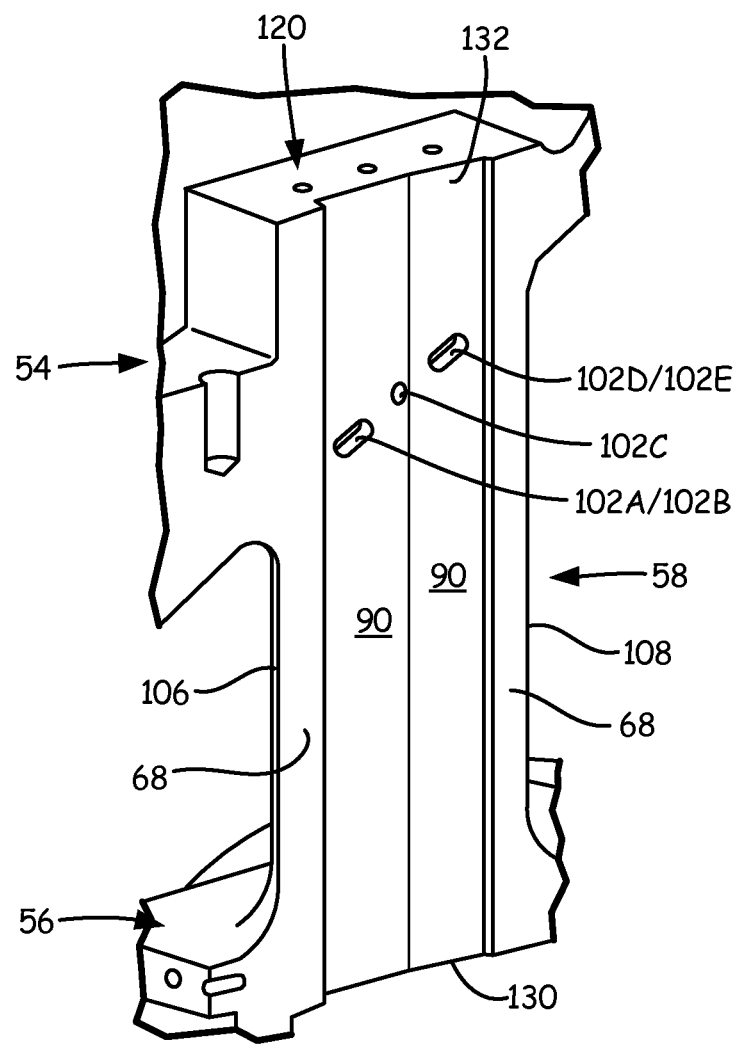
FIG. 5 shows a radial cross-section taken through line 5-5 of FIG. 3A

FIG. 4 is a detailed view of FIG. 3B, and shows film cooling holes 102A, 102B, 102C, 102D, 102E arranged linearly along outer frame junction 134. Here, film cooling holes 102A, 102B, 102C, 102D, 102E each have a substantially round cross-section and include respective exit portions 136A, 136B, 136C, 136D, 136E. Here, holes 102A, 102B intersect proximate passage 90. Similarly holes 102D, 102E intersect proximate passage 90. Exit portions 136A, 136B, 136C, 136D, 136E are arrayed in a showerhead orientation along outer frame junction 134 such that exiting cooling air contacts both outer frame 54 as well as strut wall surfaces 104. FIG. 5 shows this configuration in more detail, while FIGS. 6A-6D depict other example arrangements of film cooling holes disposed proximate outer frame junction 134.

FIG. 5 shows a radial cross-section of frame 46 taken across line 5-5 of FIG. 3A. FIG. 5 shows cooling air passages 90 extending radially through struts 58 between inner hub 56 and outer case 54. In certain embodiments of cast frame 46, passages 90 are machined radially through a previously solid strut 58. With increased radial casting dimensions, traditional milling equipment can generate excessive heat and is prone to misalignment due to the length of each strut 58. For example, in castings measuring at least about 1.5 meters (about 59 inches), each strut 58 typically has a radial dimension of at least about 0.5 meters (about 20 inches). Thus in certain embodiments, passages 90 are formed radially through solid struts using high-speed machining processes. These processes, sometimes known as "ballistic machining", utilize specialized milling equipment to achieve high rotational tool speeds, along with cooling and chip removal features to precisely direct the tool through struts 58

The number, shape, and configuration of outlets 66, passage(s) 90, and inlet(s) 130 can be selected to control or optimize the balance of cooling air between outer cooling air cavity 92 and inner cooling air cavity 94 (shown in FIG. 2A). To minimize thermal stresses on larger turbine engine frames 48, passages 90 are sized such that more than about 50% of the cooling air flow is directed toward outer case 54 and outer cavity 92, while the remainder is directed to inner hub 56 and inner cooling air cavity 94. The actual radial distribution of cooling air will vary depending on other factors such as secondary cooling air flow, material and structural properties of frame 46, and turbine operating temperature. For example, in high-strength steel alloy embodiments of frame 46, passages 90 are sized and shaped so that about 65% to about 75% of the cooling air flow is directed or retained around outer case 54, with the remainder directed or retained proximate inner hub 56. As will be seen in FIGS. 7A-7D, frame 46 can optionally or alternatively include one or more strut cooling holes disposed radially along circumferential strut walls 68 to further control cooling air balance between the outer and inner diameters of frame 46.

FIGS. 6A-6D depict various configurations of cooling air outlets located proximate outer frame junction 134. While FIGS. 6A-6D only show one circumferential face of strut 58, it will be recognized that one or both sides of strut 58 can include a cooling air outlet to effectively cool a corresponding region proximate one or both sides of outer frame junction 134.

Figures 6A, 6B:
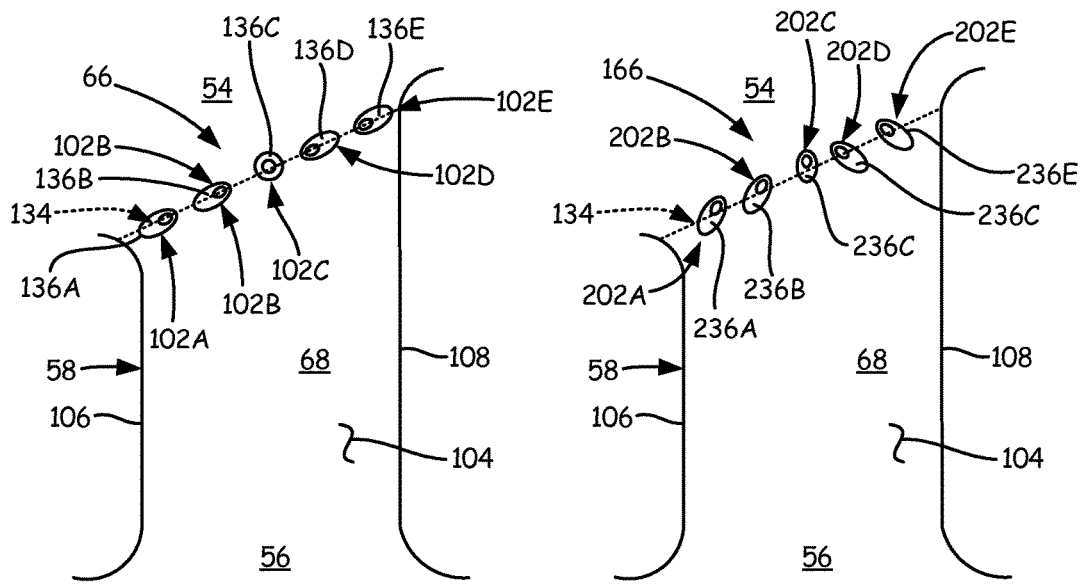
FIG. 6A shows an outlet with a first arrangement of cooling holes aligned along an outer frame junction.
FIG. 6B shows an outlet with a second arrangement of cooling holes aligned along the outer frame junction.

FIG. 6A shows one example arrangement which was previously described with respect to FIGS. 2A-5. In this example, cooling holes 102A, 102B, 102C, 102D, 102E are aligned linearly along outer frame junction 134. Exit portions 136A, 136B, 136C, 136D, 136E are shaped and angled so as to follow the angle of outer case 54. Forward holes 102A, 102B include exit portions 136A, 136B directing exiting cooling air downward (radially inboard) and forward toward strut forward end 106. Middle hole 102C includes exit portion 136C directing exiting cooling air normal to circumferential strut wall 68. Aft holes 102D, 102E include exit portions 136D, 136E directing exiting cooling air upward (radially outboard) and aftward toward strut aft end 108. As noted above with respect to FIGS. 4 and 5, one or more cooling holes 102A, 102B, 102C, 102D, 102E can intersect within strut 58.

FIG. 6B shows a second cooling air outlet 166 including an arrangement of cooling holes 202A, 202B, 202C, 202D, 202E each with respective exit portions 236A, 236B, 236C, 236D, 236E. Here, holes 202A, 202B, 202C, 202D, 202E are also aligned along outer frame junction 134. However, exit portions 236A, 236B, 236C, 236D, 236E are all angled inboard to cool more of strut 58 as compared to inner case 54. In certain embodiments, cooling holes 202A, 202B, 202C are angled up to about 45° in the radial inboard direction. In addition, forward holes 202A, 202B direct exiting cooling air forward toward strut forward end 106, while aft holes 202D, 202E directs exiting cooling air aftward toward strut aft end 108. In certain of these embodiments, one or more exit portions 236A, 236B, 236C, 236D, 236E can be angled up to about 10° in a forward or aftward direction.

Figures 6C, 6D:
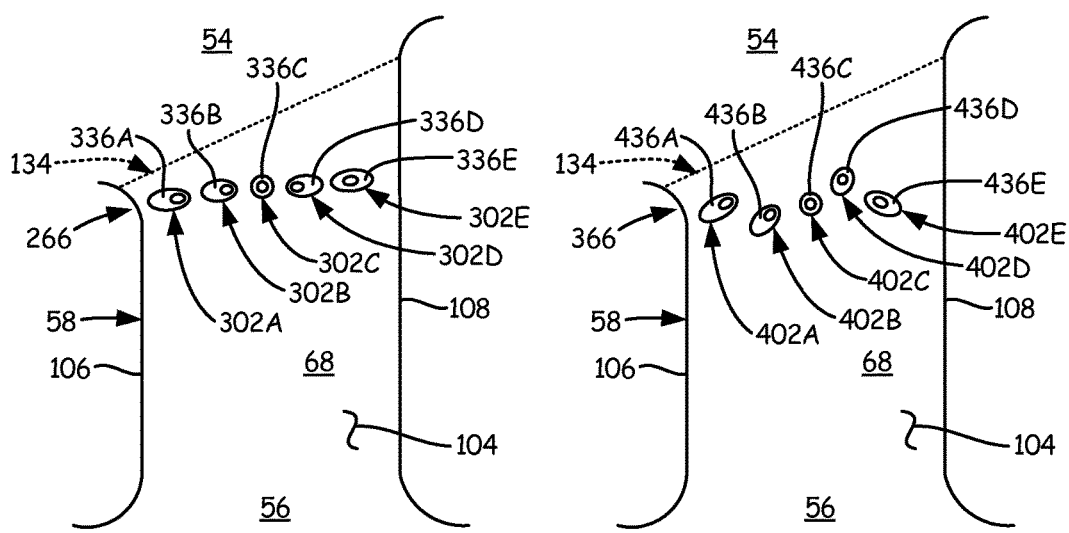
FIG. 6C shows an outlet with a third arrangement of cooling holes disposed proximate the outer frame junction and axially aligned with the engine center line.
FIG. 6D shows an outlet with a fourth arrangement of cooling holes disposed proximate the outer frame junction and axially staggered relative to the engine center line.

FIG. 6C shows a third cooling air outlet 266 including an arrangement of cooling holes 302A, 302B, 302C, 302D, 302E each with respective exit portions 336A, 336B, 336C, 336D, 336E. Here, holes 302A, 302B, 302C, 302D, 302E are disposed proximate outer frame junction 134. In contrast to FIGS. 6A and 6B, FIG. 6C shows an arrangement of film cooling holes 302A, 302B, 302C, 302D, 302E, which are aligned axially along a line parallel to engine center line 12 (shown in FIG. 1). Since the aft side holes are located apart from outer frame junction, one or more exit portions 336A, 336B, 336C, 336D, 336E can optionally be angled to direct cooling air in a radially outboard direction so as to provide sufficient cooling air to outer case 54. In certain embodiments, one or more exit portions 336A, 336B, 336C, 336D, 336E are angled up to about 45° in the radial outboard direction. In certain of these embodiments, one or more exit portions 336A, 336B, 336C, 336D, 336E can be angled up to about 10° in a forward or aftward direction.

FIG. 6D shows a fourth cooling air outlet 366 including an arrangement of cooling holes 402A, 402B, 402C, 402D, 402E each with respective exit portions 436A, 436B, 436C, 436D, 436E. Here, holes 402A, 402B, 402C, 402D, 402E are disposed proximate outer frame junction 134. In contrast to FIG. 6C, FIG. 6D shows an arrangement of film cooling holes 402A, 402B, 402C, 402D, 402E, which are axially staggered relative to a line parallel to engine center line 12 (shown in FIG. 1). Since the aft side holes are located apart from outer frame junction, one or more exit portions 436A, 436B, 436C, 436D, 436E can optionally be angled to direct cooling air in a radially outboard direction so as to provide sufficient cooling air to outer case 54. Similar to FIGS. 6A-6C, one or more exit portions 436A, 436B, 436C, 436D, 436E can be angled up to about 10° in a forward or aftward direction.

As described with respect to FIGS. 2A, 4 and 5, passages 90 can be sized to control the balance of cooling air between inner and outer portions of frame 46. FIGS. 7A-7D can also show different configurations of cooling air outlets used to help achieve a desired balance by more efficiently using higher pressure and lower temperature cooling air on the inboard portion of the frame while providing a higher flow rate to outer portions of the frame. One or more of these film cooling holes described in FIGS. 7A-7D can be formed through each strut at a location distal from the inner and outer frame junctions.

Figure 7A:
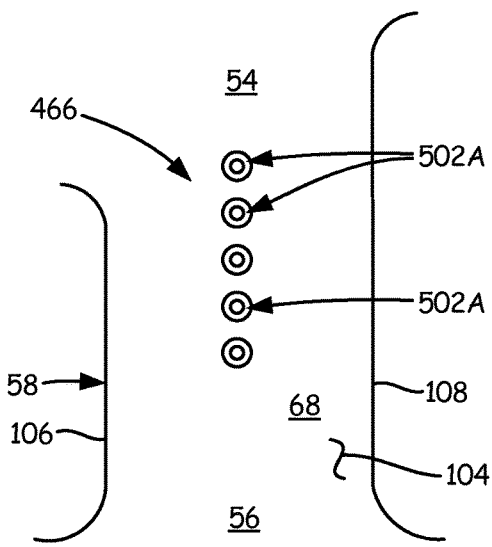
FIG. 7A shows a fifth arrangement of cooling holes radially aligned along a circumferentially facing strut wall.

FIG. 7A shows a fifth example outlet 466 with a radial arrangement of five cooling holes 502. Cooling holes 502 with exit portions 536 are aligned linearly along strut 58. Alternatively, cooling holes 502 can be aligned into multiple lines along strut 58. Exit portions 536 are shaped and angled so as to direct cooling air normal to circumferential strut wall 68. In this example, holes 502 are round and all have substantially the same cross-sectional area.

Figure 7B:
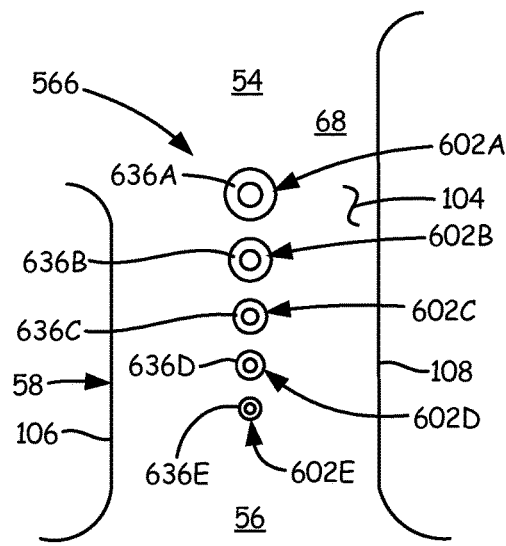
FIG. 7B shows a sixth arrangement of cooling holes radially aligned along a circumferentially facing strut wall.

FIG. 7B shows a sixth example outlet 566 with a radial arrangement of five cooling holes 602A, 602B, 602C, 602D, 602E. Cooling holes 602A, 602B, 602C, 602D, 602E with exit portions 636A, 636B, 636C, 636D, 636E are aligned linearly along strut 58. Exit portions 536 are shaped and angled so as to direct cooling air normal to circumferential strut wall 68. In this example, holes 602A, 602B, 602C, 602D, 602E are round and all have different cross-sectional areas. First hole 602A is closest to outer case 54, and has the largest cross-sectional area, while fifth hole 602E is closest to inner hub 56 and has the smallest cross-sectional area. This can be done in conjunction with embodiments of TEC assembly 42 (see, e.g., FIG. 2A) to substantially equalize cooling air effectiveness along the length of strut 58. In the configuration of FIG. 2A, cooling air experiences a pressure drop and a temperature increase as it travels radially outward through passage 90 from inner cooling air cavity 92 toward outer cooling air cavity 94. As such, fifth hole 602E closest to inner hub 56 has the highest supply pressure, while first hole 602A farthest from inner hub 56 has the lowest supply pressure with intermediate supply pressures provided to holes 602B, 602C, and 602D.

In certain alternative embodiments, one or more cooling hole exit portions 636A, 636B, 636C, 636D, 636E are angled to direct exiting cooling air upward (radially outboard) directly toward frame outer case 54. In certain of these embodiments, a majority of strut cooling holes can be directed radially outboard to help achieve a balance of more than 50% of the cooling air reaching the outer portions of struts 58 and/or outer case 54. The remainder can be disposed normally or radially inboard. Additionally or alternatively, one or more cooling hole exit portions 636A, 636B, 636C, 636D, 636E can be angled to direct exiting cooling air up to about 10° in a forward and/or aftward direction.

Figure 7C:
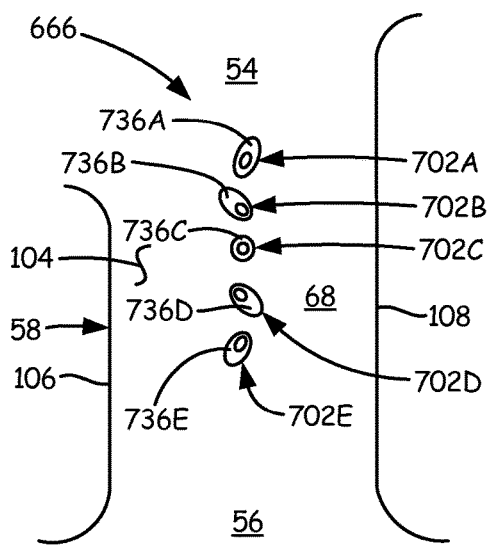
FIG. 7C shows a seventh arrangement of cooling holes radially aligned along a circumferentially facing strut wall.

FIG. 7C shows a seventh example outlet 666 with a radial arrangement of five cooling holes 702A, 702B, 702C, 702D, 702E with respective exit portions 736A, 736B, 736C, 736D, 736E. Similar to FIG. 7A, cooling holes 702A, 702B, 702C, 702D, 702E are aligned linearly along strut 58. However, one or more cooling hole exit portions 736A, 736B, 736C, 736D, 736E are angled to direct exiting cooling air upward (radially outboard) directly toward frame outer case 54. Additionally or alternatively, one or more cooling hole exit portions 736A, 736B, 736C, 736D, 736E can be angled to direct exiting cooling air up to about 10° in a forward and/or aftward direction.

Figure 7D:
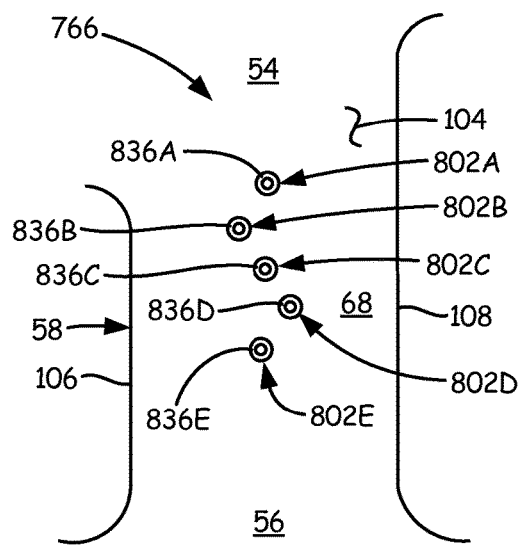
FIG. 7D shows an eighth arrangement of cooling holes disposed on a circumferentially facing strut wall and radially staggered relative to the length of the strut.

FIG. 7D shows an eighth cooling air outlet 766 including an arrangement of cooling holes 802A, 802B, 802C, 802D, 802E each with respective exit portions 836A, 836B, 836C, 836D, 836E. Here, holes 802A, 802B, 802C, 802D, 802E are disposed along strut 58. In contrast to FIGS. 7A-7C, however, FIG. 7D shows film cooling holes 802A, 802B, 802C, 802D, 802E, which are radially staggered relative to strut 58. Similar to FIGS. 7A-7C, one or more exit portions 836A, 836B, 836C, 836D, 836E can be angled to direct exiting cooling air upward (radially outboard) directly toward frame outer case 54. Additionally or alternatively, one or more cooling hole exit portions 836A, 836B, 836C, 836D, 836E can be angled to direct exiting cooling air up to about 10° in a forward and/or aftward direction.

Similar to the junction cooling holes (see, e.g., FIGS. 4 and 5), the outlets through circumferential strut wall 68 can comprise a first film cooling hole intersecting a second film cooling hole in wall 68.

Radially arranged cooling air outlets, such as those shown in FIGS. 7A-7D can allow for possible reduction of parts both in circulation through the secondary air system, as well as in regards to sealing. Cooler air can be passed to the surrounding modules (e.g. upstream module 44 and downstream module 45 shown in FIG. 2A as compared to other configurations, and thus can increase overall engine efficiency by requiring less cooling air to be pulled from the compressor. In addition, radially arranged cooling air outlets could simplify manufacturing of frame 46 (shown in FIGS. 3A and 3B) due to the possibility of smaller cooling passages 90 and the easily accessible strut walls 68.

In certain embodiments, a frame can include both strut (radial) cooling holes as well as junction cooling holes. For example, strut cooling holes may be sufficient to provide a suitable balance of cooling air between the inner and outer frame sections. However, supplemental cooling around the outer frame junction may also be provided via one or more junction cooling holes to address localized thermal or mechanical requirements. In other embodiments, outer junction cooling holes and passages may be generally sufficient to cool the region proximate the outer frame junction, but one or more strut cooling holes can be added to supplement flow balancing needs and/or provide localized cooling in and around the length of the strut.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A module for a gas turbine engine comprising:
   a frame including a circumferentially distributed plurality of radially extending struts, each strut integrally joined to an outer frame section at an outer frame junction, and integrally joined to an inner frame section at an inner frame junction; and
   a frame cooling system comprising:
      an inlet;
      a cooling air passage extending from the inlet radially through one of the plurality of frame radially extending struts;
      a first outlet in fluid communication with the cooling air passage, the first outlet including at least one film cooling hole formed through the frame proximate the outer frame junction, an exit portion of the at least one film cooling hole directed into an outer cooling air cavity toward at least one of an inner surface of the outer frame section, and an outer surface of each strut; and
      a second outlet in fluid communication with the cooling air passage, the second outlet including at least one second outlet film cooling hole formed through the frame proximate the inner frame junction, an exit portion of the at least one second outlet film cooling hole directed into an inner cooling air cavity toward at least one of an inner surface of the inner frame section, and an inner side of each strut;
      wherein the cooling air passage is sized to direct more than 50% of cooling air flow in the cooling air passage toward the outer frame section and the outer cooling air cavity.

2. The module of claim 1, further comprising:
   a fairing assembly disposed over and spaced apart from an annular frame surface.

3. The module of claim 2, wherein the fairing assembly comprises at least one of a fairing platform and a strut liner disposed over and spaced apart from the at least one film cooling hole, the film cooling hole including an exit portion angled to direct a volume of cooling air from the cooling air passage into at least one fairing cavity defined between the fairing assembly and the annular frame surface.

4. The module of claim 2, further comprising:
   a heat shield assembly including at least one heat shield element with a reflective portion disposed within the at least one fairing cavity.

5. The module of claim 1, wherein the first outlet includes a plurality of film cooling holes formed through each strut proximate the outer frame junction.

6. The module of claim 5, wherein at least one of the plurality of film cooling holes is directed radially inboard toward a circumferentially facing strut outer wall.

7. The module of claim 5, wherein the plurality of film cooling holes are arranged linearly along the outer frame junction.

8. The module of claim 1, wherein the frame cooling system includes a plurality of cooling air inlets providing fluid communication between each cooling air passage and the inner cooling air cavity disposed radially inward of the inner frame section, each inlet circumferentially aligned relative to each cooling air passage.

9. The module of claim 1, further comprising:
a first turbine section operable to rotate a first shaft;
a second turbine section operable to rotate a second shaft independent of the first shaft;
wherein the outer frame section interconnects an outer case of the first turbine section with an outer case of the second turbine section.

10. The module of claim 1, wherein the module comprises a turbine exhaust case assembly.

11. The module of claim 10, wherein the turbine exhaust case assembly is adapted to interconnect a low-pressure turbine assembly to a power turbine assembly.

12. The module of claim 1, wherein the frame cooling system comprises at least one cooling air passage extending radially through each of the plurality of circumferentially distributed radially extending struts.

13. A gas turbine engine frame comprising:
an outer case;
an inner hub;
a first strut extending radially between the inner hub and the outer case, the first strut integrally joined to the outer case at an outer frame junction, and integrally joined to the inner hub at an inner frame junction; and
a frame cooling system including an inlet, a cooling air passage extending from the inlet radially through the strut, a first outlet in fluid communication with the cooling air passage, the first outlet including at least one film cooling hole formed through at least one circumferential side of the outer frame junction, an exit portion of the at least one film cooling hole directed toward at least one of an inner surface of an outer frame section, and an outer surface of the first strut, and a second outlet in fluid communication with the cooling air passage, the second outlet including at least one second outlet film cooling hole formed through the frame proximate the inner frame junction, an exit portion of the at least one second outlet film cooling hole directed into an inner cooling air cavity toward at least one of an inner surface of the inner frame section, and an inner side of the first strut;
wherein the cooling air passage is sized to direct more than 50% of cooling air flow in the cooling air passage toward the outer case and the outer cooling air cavity.

14. The frame of claim 13, wherein the at least one film cooling hole comprises a second exit portion directed toward a circumferentially facing first strut wall.

15. The frame of claim 13, further comprising:
a circumferentially distributed plurality of struts including the first strut, each strut integrally extending radially between the inner hub and the outer case, and each strut integrally joined to the outer case at the outer frame junction, and joined to the inner case at the inner frame junction;
wherein each strut includes at least one cooling air passage extending radially therethrough.

16. The frame of claim 13, wherein the first outlet comprises a plurality of film cooling holes, including the at least one film cooling hole, arranged linearly along the outer frame junction.

17. The frame of claim 13, wherein the second outlet comprises a second plurality of second outlet film cooling holes, including the at least one second outlet film cooling hole, linearly along a line parallel to an engine centerline.

18. The frame of claim 13, wherein at least one of the first outlet and the second outlet comprises a plurality of film cooling holes, including the at least one film cooling hole, arranged in an axially staggered manner relative to a line parallel to an engine center line.

19. The frame of claim 13, wherein a plurality of film cooling holes, including the at least one film cooling hole comprises a second exit portion extending normal to a circumferentially facing strut wall.

20. The frame of claim 13, wherein a plurality of film cooling holes, including the at least one film cooling hole comprises a second exit portion angled in a radial outboard direction relative to a circumferentially facing strut wall.

21. The frame of claim 20, wherein the at least one film cooling hole comprises a third exit portion angled in a radial inboard direction relative to the circumferentially facing strut wall.

22. The frame of claim 20, wherein the at least one film cooling hole comprises an exit portion angled in an axial forward direction relative to the circumferentially facing strut wall.

23. The frame of claim 20, wherein the at least one film cooling hole comprises a third exit portion angled in an axial aft direction relative to the circumferentially facing strut wall.

24. The frame of claim 20, wherein the first outlet comprises a first film cooling hole intersecting with a second cooling hole in the circumferentially facing strut wall.

* * * * *

UNITED STATES PATENT AND TRADEMARK OFFICE
CERTIFICATE OF CORRECTION

Page 1 of 1

PATENT NO. : 10,240,532 B2
APPLICATION NO. : 14/655656
DATED : March 26, 2019
INVENTOR(S) : Jonathan Ariel Scott et al.

It is certified that error appears in the above-identified patent and that said Letters Patent is hereby corrected as shown below:

In the Specification

Column 3, Line 33:
Delete "low-pres sure"
Insert -- low-pressure --

Signed and Sealed this
Fourth Day of June, 2019

Andrei Iancu
*Director of the United States Patent and Trademark Office*